United States Patent
Chen

(10) Patent No.: US 8,918,676 B2
(45) Date of Patent: Dec. 23, 2014

(54) METHOD AND APPARATUS FOR RESTARTING COMMUNICATION AFTER REGISTRATION OF SUBSCRIBER IDENTITY MODULE SIM CARD FAILS

(71) Applicant: Huawei Technologies Co., Ltd., Shenzhen, Guangdong (CN)

(72) Inventor: Hui Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 208 days.

(21) Appl. No.: 13/754,438

(22) Filed: Jan. 30, 2013

(65) Prior Publication Data

US 2013/0262927 A1    Oct. 3, 2013

(30) Foreign Application Priority Data

Mar. 28, 2012  (CN) .......................... 2012 1 0086304

(51) Int. Cl.
*G06F 11/07*   (2006.01)
*H04W 8/00*   (2009.01)

(52) U.S. Cl.
CPC ............. *G06F 11/0793* (2013.01); *H04W 8/00* (2013.01)
USPC ........................................................ 714/23

(58) Field of Classification Search
CPC ............ G06F 11/0793; G06F 11/1438; G06F 11/1441; G06F 1/24

USPC ............................................................ 714/23
See application file for complete search history.

(56) References Cited

U.S. PATENT DOCUMENTS

| | | | |
|---|---|---|---|
| 8,495,422 B2 * | 7/2013 | Mezhibovsky et al. | 714/24 |
| 8,630,641 B2 * | 1/2014 | Kim et al. | 455/435.1 |
| 2002/0142813 A1 * | 10/2002 | Cassidy et al. | 455/575 |
| 2004/0225800 A1 * | 11/2004 | Lin | 710/301 |
| 2009/0156254 A1 * | 6/2009 | Montes | 455/558 |
| 2009/0163245 A1 * | 6/2009 | Oozeki | 455/558 |
| 2014/0004831 A1 * | 1/2014 | Yao et al. | 455/411 |

FOREIGN PATENT DOCUMENTS

| | | | |
|---|---|---|---|
| CN | 101178680 A | | 5/2008 |
| CN | 102098390 A | * | 6/2011 |
| CN | 102262432 A | | 11/2011 |
| JP | 2003264631 A | * | 9/2003 |
| KR | 2008032929 A | * | 4/2008 |
| KR | 2008094349 A | * | 10/2008 |

* cited by examiner

*Primary Examiner* — Chae Ko

(57) ABSTRACT

Disclosed in the present invention are a method and an apparatus for restarting communication after registration of a subscriber identity module SIM card fails, which belongs to the field of mobile communications. The method includes: acquiring failure information about registration of the SIM card; displaying the failure information and prompt information on an interface, and receiving confirmation information that is replied by a user according to the prompt information; and restarting, according to the confirmation information, a communication processor under the condition of not turning off an application processor or not restarting the application processor, so as to re-register the SIM card.

10 Claims, 2 Drawing Sheets

METHOD AND APPARATUS FOR RESTARTING COMMUNICATION AFTER REGISTRATION OF SUBSCRIBER IDENTITY MODULE SIM CARD FAILS

CROSS-REFERENCE TO RELATED APPLICATIONS

This application claims priority to Chinese Patent Application No. 201210086304.5, filed on Mar. 28, 2012, which is hereby incorporated by reference in its entirety.

FIELD OF THE INVENTION

The present invention relates to the field of mobile communications, and in particular, to a method and an apparatus for restarting communication after registration of a subscriber identity module SIM card fails.

BACKGROUND OF THE INVENTION

During the use of a cell phone, a SIM (Subscriber Identity Module, subscriber identity module) card needs to be registered first, and then a communication function of the cell phone can be used. After the cell phone enters a region where no signal coverage exists or signal quality is poor, for example, a subway, an elevator, or a basement, the problem that the registration of the SIM card of the cell phone fails occurs. If the reason of the failure is that the network considers the SIM card to be illegal, network residence cannot be restored even through manual network search, and a user must turn off the cell phone manually and restart a whole machine of the cell phone to restore a network connection.

In the prior art, the SIM card can be re-registered only by powering off the cell phone and then restarting the whole machine of the cell phone, so that the SIM card re-accesses the network. However, as smart phones are popular and more and more application programs in the smart phone exist, it takes a long time to power down and restart the smart phone, and if the user is using an application program of the smart phone, the restart after the turn-off affects the experience for the user to use the cell phone.

SUMMARY OF THE INVENTION

In order to avoid restarting a whole machine after registration of a subscriber identity module SIM card fails, increase a speed for the SIM card to re-access a network, and further improve user experience, embodiments of the present invention provide a method and an apparatus for restarting communication after registration of a subscriber identity module SIM card fails. The technical solutions are as follows:

A method for restarting communication after registration of a subscriber identity module SIM card fails includes:

acquiring failure information about registration of the SIM card;

displaying the failure information and prompt information on an interface, and receiving confirmation information that is replied by a user according to the prompt information; and restarting, according to the confirmation information, a communication processor under the condition of not turning off an application processor or not restarting the application processor, so as to re-register the SIM card.

An apparatus for restarting communication after registration of a subscriber identity module SIM card fails includes:

an acquisition module, configured to acquire failure information about registration of the SIM card;

a display module, configured to display the failure information and prompt information on an interface, and receive confirmation information that is replied by a user according to the prompt information; and a restart module, configured to restart, according to the confirmation information, a communication processor under the condition of not turning off an application processor or not restarting the application processor, so as to re-register the SIM card.

Beneficial effects of the technical solutions provided by the embodiments of the present invention are as follows:

After the registration of the SIM card fails, only the communication processor in a terminal is restarted, the application processor in the terminal is not restarted, and the restarted communication processor re-registers the SIM card, and thereby avoiding the restart of the whole machine after the registration of the SIM card fails, increasing the speed for the SIM card to re-access the network. Therefore, user experience is improved.

BRIEF DESCRIPTION OF THE DRAWINGS

To illustrate the technical solutions in the embodiments of the present invention more clearly, the accompanying drawings required for describing the embodiments of the present invention are briefly introduced in the following. Apparently, the accompanying drawings in the following description merely show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the present invention clearer, the embodiments of the present invention are hereinafter described in detail with reference to the accompanying drawings.

Embodiment 1

Figure 1:
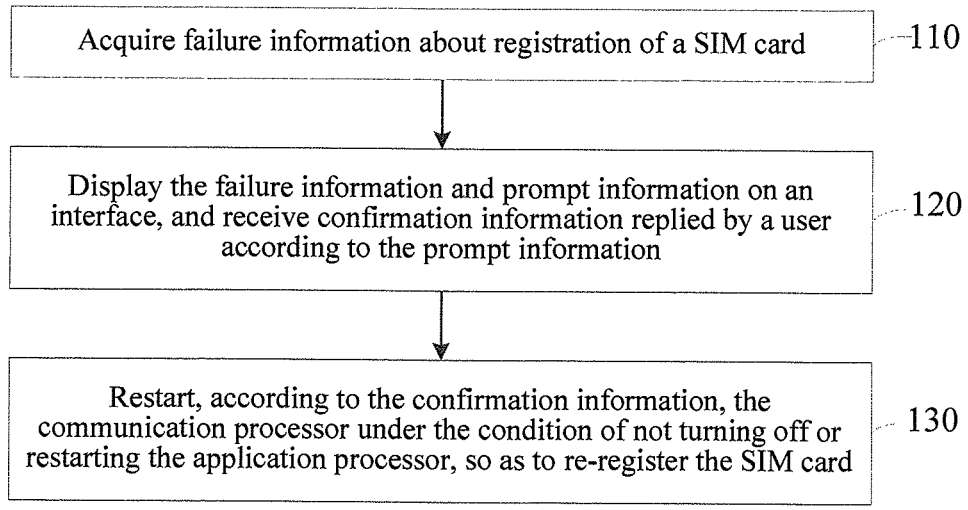
FIG. 1 is a schematic flow chart of a method for restarting communication after registration of a subscriber identity module SIM card fails provided by Embodiment 1 of the present invention.

FIG. 1 is a schematic flow chart of a method for restarting communication after registration of a subscriber identity module SIM card fails provided by Embodiment 1 of the present invention. The method for restarting the communication after the registration of the SIM card fails may be applied in a terminal, where the terminal may be a terminal with SIM card identification, for example, a cell phone, a mobile phone, a fixed phone, a net book, a personal computer, and a server.

The method for restarting the communication after the registration of the subscriber identity module SIM card fails includes the following steps:

Step 110: Acquire failure information about registration of the SIM card.

Generally, when the terminal enters a region where no signal coverage exists or signal quality is poor, the SIM card in the terminal often fails to be identified by a network, that is, the registration of the SIM card fails and the SIM card is determined as an illegal SIM card by the network. In this case, the terminal acquires the failure information about the registration of the SIM card.

Step 120: Display the failure information and prompt information on an interface, and receive confirmation information that is replied by a user according to the prompt information.

Generally, the displaying of the failure information and the prompt information on the interface is controlled by an application processor in the terminal. The application processor is mainly responsible for work of various application programs inside the terminal, and the application processor may trigger the start of any application program in the terminal. The prompt information may be a control for restarting a communication processor or a control for canceling the restart of the communication processor, for the user to select.

The user can select to restart the communication processor or cancel the restart of the communication processor according to the prompt information displayed on the interface. When the user selects to restart the communication processor, the terminal receives the confirmation information that is replied by the user according to the prompt information.

Step 130: Restart, according to the confirmation information, the communication processor under the condition of not turning off the application processor or not restarting the application processor, so as to re-register the SIM card.

The application processor is mainly responsible for the work of the various application programs inside the terminal, and the application processor may trigger the start of any application program in the terminal, where the application programs may include programs such as a browser, a chat program, a calculator, a clock display, and a prompt box.

The communication processor is mainly responsible for the work such as communication connection and communication transmission between the SIM card in the terminal and the network. Only when the communication processor is in a started state, the communication processor can control all communication work of the terminal.

In this step, only the communication processor is restarted and the application processor is not restarted, that is, only the communication processor is restarted in the case of not restarting a whole machine.

In conclusion, in the method for restarting the communication after the registration of the subscriber identity module SIM card fails provided by Embodiment 1 of the present invention, after the registration of the SIM card fails, only the communication processor in the terminal is restarted and the application processor is not restarted, and thereby avoiding the restart of the whole machine after the registration of the SIM card fails, increasing a speed for the SIM card to re-access the network. Therefore, user experience is improved.

Embodiment 2

Figure 2:
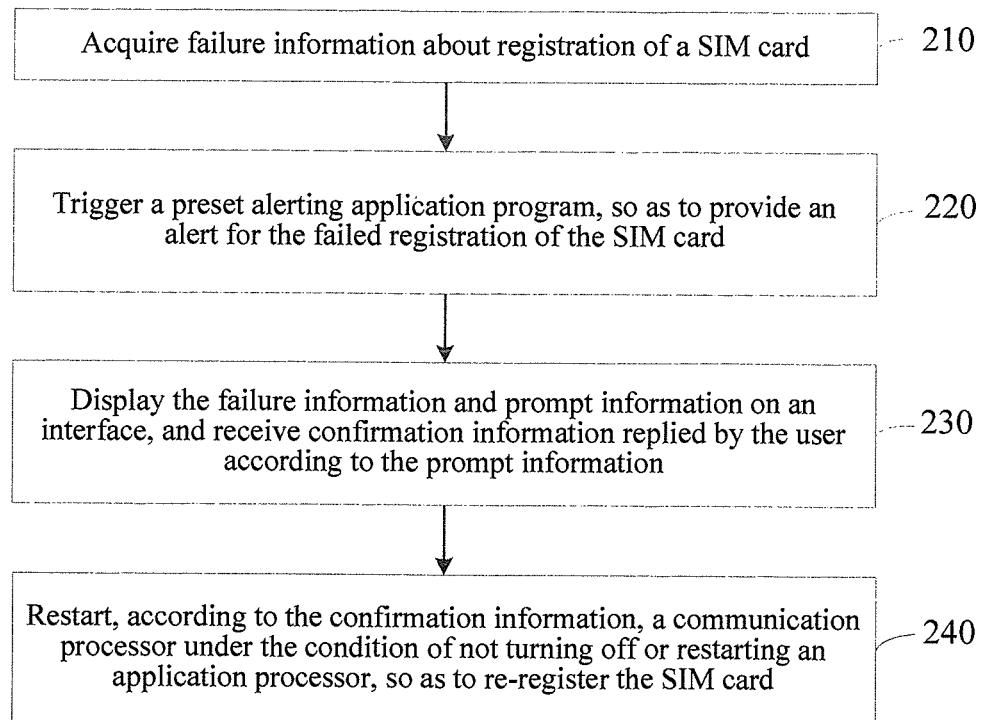
FIG. 2 is a schematic flow chart of a method for restarting communication after registration of a subscriber identity module SIM card fails provided by Embodiment 2 of the present invention.

FIG. 2 is a schematic flow chart of a method for restarting communication after registration of a subscriber identity module SIM card fails provided by Embodiment 2 of the present invention. The method for restarting the communication after the registration of the SIM card fails may be applied in a terminal, where the terminal may be a terminal with SIM card identification, for example, a cell phone, a mobile phone, a fixed phone, a net book, a personal computer, and a server. The method for restarting the communication after the registration of the subscriber identity module SIM card fails includes the following steps:

Step 210: Acquire failure information about registration of the SIM card.

Generally, when a terminal enters a region where no signal coverage exists or signal quality is poor, the SIM card in the terminal often fails to be identified by a network, that is, the registration of the SIM card fails and the SIM card is determined as an illegal SIM card by the network. In this case, a communication processor inside the terminal may acquire the failure information about registration of the SIM card, and then upload the failure information about registration of the SIM card to an application processor inside the terminal.

The communication processor is mainly responsible for the work such as communication connection and communication transmission between the SIM card in the terminal and the network, where the communication processor may be a modem for enabling the terminal to access the network.

The application processor is mainly responsible for work of various application programs inside the terminal, and the application processor may trigger the start of any application program in the terminal, where the application programs may include programs such as a browser, a chat program, a calculator, a clock display, and a prompt box.

Step 220: Trigger a preset alerting application program, so as to provide an alert for the registration failure of the SIM card.

The alerting application program may be a vibration application program, a ringing application program, and an application program capable of playing alarm information such as a ring tone, and certainly, may also be another application program for effectively alerting a user.

After the failure information about registration of the SIM card is acquired, in order to quickly alert the user, only the prompt information displayed on an interface of the terminal is often insufficient. Generally, the alerting application program may be preset. After the application processor inside the terminal acquires the failure information about the registration of the SIM card, the preset alerting application program may be triggered to provide the alert for the registration failure of the SIM card.

Step 230: Display the failure information and prompt information on the interface, and receive confirmation information that is replied by the user according to the prompt information. The step 220 may be executed before the process of displaying the failure information and the prompt information on the interface in step 230, or the step 220 and the process of displaying the failure information and the prompt information on the interface in step 230 may be executed simultaneously, or the step 220 may be performed after the process of displaying the failure information and the prompt information on the interface in step 230.

After the application processor receives the failure information about registration of the SIM card, the application processor starts a terminal interface program, so that the failure information and the prompt information are displayed on the terminal interface.

Figure 3:
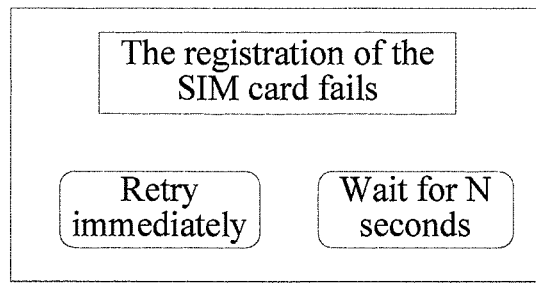
FIG. 3 is a schematic diagram of displaying failure information and prompt information on an interface in Embodiment 2 of the present invention.

The displayed failure information may be on-screen prompt information, for example, "The registration of the SIM card fails", so that after seeing the displayed failure information, the user knows that the registration of the SIM card fails. In this way, the user can perform subsequent operations according to requirements. In a specific example, a schematic diagram of the failure information displayed on the terminal interface is shown in FIG. 3, where the displayed failure information is "The registration of the SIM card fails".

The displayed prompt information may include an immediate restart prompt used for an immediate restart or a restart delay prompt used for a restart delay. In a specific application, the immediate restart prompt or the restart delay prompt can be implemented through two selection controls. In this way, the user can trigger the generation of corresponding confirmation information by selecting the prompt information (that is, select the immediate restart prompt used for the immediate restart or select the restart delay prompt used for the restart delay). For example, a control "Restart immediately" in FIG. 3 may be used to represent the immediate restart prompt used for the immediate restart. After the user selects the control "Restart immediately", confirmation information is generated, where the confirmation information is immediate restart information. For another example, a control "Wait for N seconds" in FIG. 3 may be used to represent the restart delay prompt used for the restart delay. After the user selects the control "Wait for N seconds", confirmation information is generated, where the confirmation information is restart delay information.

The N seconds is a predetermined time, which can be set according to specific conditions (for example, factors such as the operating capability of the communication processor), for example, can be set to 5 seconds, or 10 seconds, and even can be set to a value greater than 60 seconds. An option "Ignore" may even be included on the terminal interface, so as to be used when the user uses an illegal SIM card. Even a setting platform may be provided for the user, so that the user can preset a specific value of the N seconds for the terminal.

In a practical application, only a control used for the immediate restart or only a control used for the restart delay may be set on the interface; the control used for the immediate restart and the control used for the restart delay may also be set simultaneously, and in this case, the user needs to perform selection. Generally, after knowing that the SIM card fails, the user may select to restart the communication processor immediately or to delay restarting the communication processor according to requirements. For example, in a tunnel or in a basement, no signal exists indeed, continuous network search increases power consumption of the terminal. In this case, a measure of performing delay for the predetermined time (for example, N seconds or M minutes) may reduce the power consumption and prolong the standby time. In the case of good signals, the user may select the immediate restart to perform communication connection as soon as possible. Certainly, if only the immediate restart information is set, after the failure information about registration of the SIM card is acquired, the communication processor may be restarted directly.

Step 240: Restart, according to the confirmation information, the communication processor under the condition of not turning off the application processor or not restarting the application processor, so as to re-register the SIM card.

It can be known from the foregoing that, the confirmation information may generally include the immediate restart information or the restart delay information. In the case of acquiring the immediate restart information, the communication processor is immediately restarted. In the case of acquiring the restart delay information, a timer is first started, and when a preset time of the timer arrives, the communication processor is restarted.

Correspondingly, the time set in the timer is N seconds in FIG. 3.

After the communication processor is restarted, the communication processor re-registers the SIM card, that is, the communication processor re-initiates network search and authentication. It can be understood that, after the communication processor is restarted, the communication processor re-initiates the network search, and then attempts to authenticate the SIM card after the network search is successful.

Generally, after the registration of the SIM card is successful, the display information about the successful registration of the SIM card is displayed on the terminal interface, to provide for the user a prompt that the registration of the SIM card is successful and that a network associated with the SIM can be used normally. A specific process of displaying the display information about the successful registration of the SIM card on the terminal interface is as follows:

S1: After the registration of the SIM card is successful, implement network residence and enter a normal standby state.

After the registration of the SIM card is successful, that is, after the network search and the authentication of the SIM are successful, network residence is implemented, and the terminal enters the normal standby state, so that the SIM card in the terminal uses a searched-out network.

S2: Receive the information about the successful registration of the SIM card that is fed back by the communication processor.

After the registration of the SIM card is successful, the communication processor generates information about the successful registration of the SIM card, and the processor inside the terminal correspondingly receives the information about the successful registration of the SIM card.

S3: Display the display information about the successful registration of the SIM card on the interface according to the success information.

Generally, after receiving the information about the successful registration of the SIM card, the processor inside the terminal sends the success information to the application processor, and after receiving the success information, the application processor starts an interface display application program or a prompt box application program to display the display information about the successful registration of the SIM card, and further provides the user with the information about the successful registration of the SIM card.

In conclusion, in the method for restarting the communication after the registration of the SIM card fails provided by Embodiment 2 of the present invention, first, the alert may be provided for the user after the registration of the SIM card fails; second, only the communication processor is restarted in the case of not restarting the application processor, which does not affect the use of the application program by the user; lastly, the user can select, according to the specific conditions, to restart the communication processor immediately or restart the communication processor after waiting for N minutes, which can reduce power consumption of the terminal in the case of poor network signals, thereby improving user experience.

Embodiment 3

Figure 4:
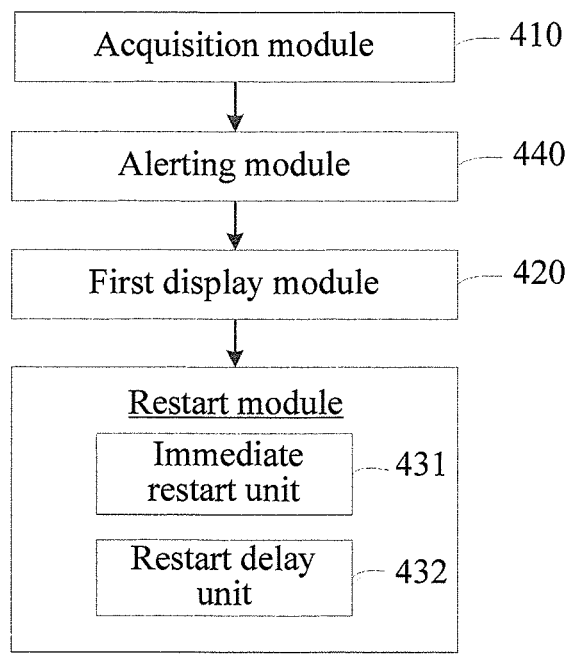
FIG. 4 is a schematic structural diagram of an apparatus for restarting communication after registration of a subscriber identity module SIM card fails provided by Embodiment 3 of the present invention.

FIG. 4 is a schematic structural diagram of an apparatus for restarting communication after registration of a subscriber identity module SIM card fails provided by Embodiment 3 of the present invention. The apparatus for restarting the communication after the registration of the SIM card fails may be a terminal, for example, a terminal with SIM card identification, for example, a cell phone, a mobile phone, a fixed phone, a net book, a personal computer, and a server. The apparatus for restarting the communication after the registration of the subscriber identity module SIM card fails includes an acquisition module 410, a display module 420, and a restart module 430.

The acquisition module 410 may be configured to acquire failure information about registration of the SIM card.

Generally, when the terminal enters a region where no signal coverage exists or signal quality is poor, the SIM card in the terminal often fails to be identified by a network, that is, the registration of the SIM card fails and the SIM card is determined as an illegal SIM card by the network. In this case, a communication processor may acquire the failure information about registration of the SIM card, and then upload the failure information about registration of the SIM card to an application processor.

The communication processor is mainly responsible for the work such as communication connection and communication transmission between the SIM card in the terminal and the network, where the communication processor may be a modem for enabling the terminal to access the network.

The application processor is mainly responsible for work of various application programs inside the terminal, and the application processor may trigger the start of any application program in the terminal, where the application programs may include programs such as a browser, a chat program, a calculator, a clock display, and a prompt box.

The display module 420 may be configured to display the failure information and prompt information on an interface and receive confirmation information that is replied by a user according to the prompt information.

After the application processor receives the failure information about registration of the SIM card, the application processor starts a terminal interface program, so that the failure information and the prompt information are displayed on a terminal interface.

The displayed failure information may be on-screen prompt information, for example, "The registration of the SIM card fails", so that after seeing the displayed failure information, the user knows the registration of the SIM card fails. In this way, the user can perform subsequent operations according to requirements. In a specific example, a schematic diagram of the failure information displayed on the terminal interface is shown in FIG. 3, where the displayed failure information is the on-screen prompt information, that is, "The registration of the SIM card fails".

The displayed prompt information may include an immediate restart prompt used for an immediate restart or a restart delay prompt used for a restart delay. In a specific application, the immediate restart prompt used for the immediate restart or the restart delay prompt used for the restart delay may be implemented by two selection controls. In this way, the user can trigger the generation of corresponding confirmation information by selecting the prompt information (that is, select the immediate restart prompt used for the immediate restart or select the restart delay prompt used for the restart delay). For example, a control "Restart immediately" in FIG. 3 may be used to represent the immediate restart prompt used for the immediate restart. After the user selects the control "Restart immediately", confirmation information is generated, where the confirmation information is immediate restart information. For another example, a control "Wait for N seconds" in FIG. 3 may be used to represent the restart delay prompt used for the restart delay. After the user selects the control "Wait for N seconds", confirmation information is generated, where the confirmation information is restart delay information.

The N seconds is a predetermined time, which can be set according to specific conditions (for example, factors such as the operating capability of the communication processor), for example, can be set to 5 seconds, or 10 seconds, and even can be set to a value greater than 60 seconds. In an exemplary embodiment, an option "Ignore" may even be included in the terminal interface, so as to be used when the user needs to use an illegal SIM card.

In a practical application, only a control used for the immediate restart or only a control used for the restart delay may be set on the interface; the control used for the immediate restart and the control used for the restart delay may also be set simultaneously, and in this case, the user needs to perform selection. Generally, after knowing that the SIM card fails, the user may select to restart the communication processor immediately or to delay restarting the communication processor according to requirements. For example, in a tunnel or in a basement, no signal exists indeed, continuous network search increases power consumption of the terminal. In this case, a measure of performing delay for the predetermined time (for example, N seconds or M minutes) may reduce the power consumption and prolong the standby time. In the case of good signals, the user may select the immediate restart to perform communication connection as soon as possible. Certainly, if only the immediate restart information is set, after the failure information about registration of the SIM card is acquired, the communication processor may be restarted directly.

The restart module 430 may be configured to restart, according to the confirmation information, a communication processor under the condition of not turning off the application processor or not restarting the application processor, so as to re-register the SIM card.

Further, the confirmation information may include the immediate restart information or the restart delay information. Correspondingly, the restart module 430 may include an immediate restart unit 431 or a restart delay unit 432.

When the confirmation information is the immediate restart information, the immediate restart unit 431 may be configured to restart the communication processor according to the selected immediate restart information.

When the confirmation information is the restart delay information, the restart delay unit 432 may be used to start a timer according to the selected restart delay information and restart the communication processor when the timer reaches a set time.

The immediate restart information and the restart delay information may be acquired through selection of the user. For example, after the controls of "Restart immediately" and "Wait for N seconds" in FIG. 3 are selected respectively, the immediate restart information and the restart delay information may be acquired respectively.

Certainly, in a practical application, after the registration of the SIM card fails and when the network determines the SIM to be illegal, the apparatus for restarting the communication after the registration of the subscriber identity module SIM card fails may further include an alerting module 440.

The alerting module 440 may be configured to, after the display module 420 displays the failure information and the prompt information on the interface, trigger a preset alerting application program to provide an alert. The alerting application program may be vibration, ringing, or the like, and may also be another application program for effectively alerting the user. After acquiring the alert, the user views the related information displayed in the terminal interface to perform subsequent operation, that is, the operation of restarting the communication processor.

Generally, after the registration of the SIM card is successful, the display information about the successful registration of the SIM card is displayed in the terminal interface, to provide for the user a prompt that the registration of the SIM card is successful and that a network associated with the SIM can be used normally. A specific process of displaying the display information about the successful registration of the SIM card in the terminal interface needs to be implemented by a resident module, a receiving module, and a success information display module.

The resident module may be configured to, after the registration of the SIM card is successful, implement network residence and enter a normal standby state.

After the communication processor is restarted, the communication processor re-registers the SIM card, that is, the communication processor re-initiates network search and authentication, and after the network search and the authentication are successful, the network residence is implemented and the normal standby state is entered. That is, after the communication processor is restarted, the communication processor re-initiates the network search and attempts to authenticate the SIM card after the network search is successful. After the authentication is successful, the network residence is implemented and the terminal enters the normal standby state, so that it is convenient for the terminal to use the network.

The receiving module may be configured to receive the information about the successful registration of the SIM card that is fed back by the communication processor.

The success information display module may be configured to display, according to the success information, the display information about the successful registration of the SIM card on the interface.

It should be noted that, in the communication restart, the apparatus for restarting the communication after the registration of the SIM card fails provided by the foregoing embodiment is illustrated with the division of foregoing function modules. In a practical application, the foregoing functions can be distributed to different function modules for implementation according to requirements, that is, an internal structure of the apparatus is divided into different function modules to complete all or part of the functions described in the foregoing. In addition, the apparatus for restarting the communication after the registration of the SIM card fails provided by the foregoing embodiment has the same conception as the method for restarting the communication after the registration of the SIM card fails. For a specific implementation process of the apparatus, reference may be made to the method embodiment, which will not be described herein again.

In conclusion, in the apparatus for restarting the communication after the registration of the SIM card fails provided by Embodiment 3 of the present invention, first, the alert may be provided for the user after the registration of the SIM card fails; second, only the communication processor is restarted in the case of not restarting the application processor, which does not affect the use of the application program by the user; lastly, the user can select, according to the specific conditions, to restart the communication processor immediately or restart the communication processor after waiting for N minutes, which can reduce power consumption of the terminal in the case of poor network signals. Therefore, user experience is improved.

In a practical application, a simpler method for restarting communication after registration of a SIM card fails is: acquiring failure information about registration of the SIM card, and then directly restarting the communication processor, so that the communication processor re-registers the SIM card.

That is to say, the communication processor may first perform the network search and authenticate the SIM card. If the registration of the SIM fails and the SIM card is determined as an illegal SIM card by the network, the failure information about registration of the SIM card is acquired. Then, the communication processor is directly restarted and any processing is not performed on the application processor. In this manner, after the registration of the SIM fails, the communication processor is restarted automatically, and the application processor is not restarted, which does not affect the use of the application processor by a client and is more convenient. However, the methods shown in Embodiment 1 and Embodiment 2 can prompt the user or alert the user, provide a selection of restarting the communication processor for the user, and restart the communication processor immediately or delay restarting the communication processor according to the selection of the user, thereby preventing continuously restarting the communication processor in the case of poor signals, reducing power consumption of the terminal, and improving user experience.

It should be noted that, the embodiments of the present invention are described with attachment to the terminal. In a practical application, the method and the apparatus for restarting the communication after the registration of the SIM fails may also be attached to another mobile terminal, for example, a mobile terminal with SIM card identification, for example, a mobile phone, a fixed phone, and a net book.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing descriptions are merely exemplary embodiments, and are not intended to limit the present invention. Any modification, equivalent replacement, or improvement made within the spirit and principle of the present invention shall all fall within the protection scope of the present invention.

What is claimed is:

1. A method for restarting communication after registration of a subscriber identity module SIM card fails, comprising:
   acquiring failure information about registration of the SIM card;
   displaying the failure information and prompt information on an interface, and receiving confirmation information that is replied by a user according to the prompt information; and
   restarting, according to the confirmation information, a communication processor under a condition of not turning off an application processor or not restarting the application processor, so as to re-register the SIM card.

2. The method according to claim 1, wherein the confirmation information comprises immediate restart information, and the restarting, according to the confirmation information, the communication processor comprises:
   restarting the communication processor according to the immediate restart information.

3. The method according to claim 1, wherein the confirmation information comprises restart delay information, and the restarting, according to the confirmation information, the communication processor comprises:
   starting a timer according to the restart delay information; and restarting the communication processor when the timer reaches a set time.

4. The method according to claim 1, wherein the prompt information comprises: at least one of an immediate restart prompt and a restart delay prompt.

5. The method according to claim 1, wherein after the displaying the failure information and the prompt information on the interface, the method further comprises:
triggering a preset alerting application program, so as to provide an alert for registration failure of the SIM card.

6. An apparatus for restarting communication after registration of a subscriber identity module SIM card fails, comprising:
an acquisition module, configured to acquire failure information about registration of the SIM card;
a display module, configured to display the failure information and prompt information on an interface, and receive confirmation information that is replied by a user according to the prompt information; and
a restart module, configured to restart, according to the confirmation information, a communication processor under a condition of not turning off an application processor or not restarting the application processor, so as to re-register the SIM card.

7. The apparatus according to claim 6, wherein the confirmation information comprises immediate restart information, and the restart module comprises:
an immediate restart unit, configured to restart the communication processor according to the immediate restart information selected.

8. The apparatus according to claim 6, wherein the confirmation information comprises restart delay information, and the restart module comprises:
a restart delay unit, configured to start a timer according to the restart delay information selected and restart the communication processor when the timer reaches a set time.

9. The apparatus according to claim 6, wherein the prompt information comprises: at least one of an immediate restart prompt and a restart delay prompt.

10. The apparatus according to claim 6, further comprising:
an alerting module, configured to trigger a preset alerting application program after the display module displays the failure information and the prompt information on the interface, so as to provide an alert for registration failure of the SIM card.

* * * * *